United States Patent Office 3,199,610
Patented Aug. 10, 1965

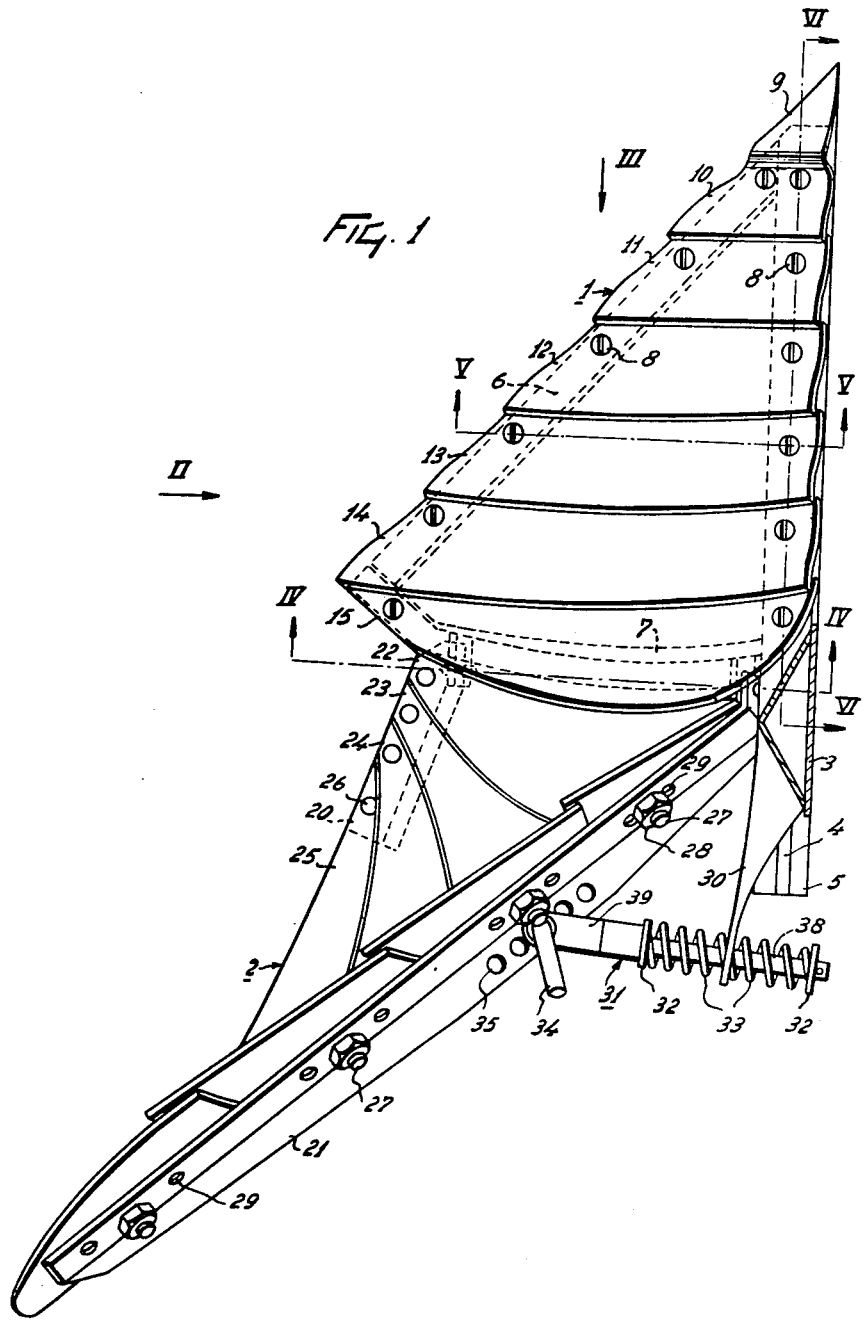

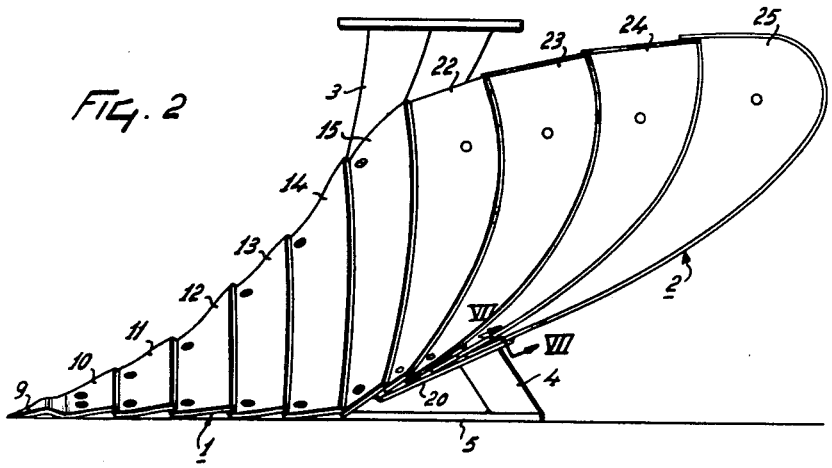
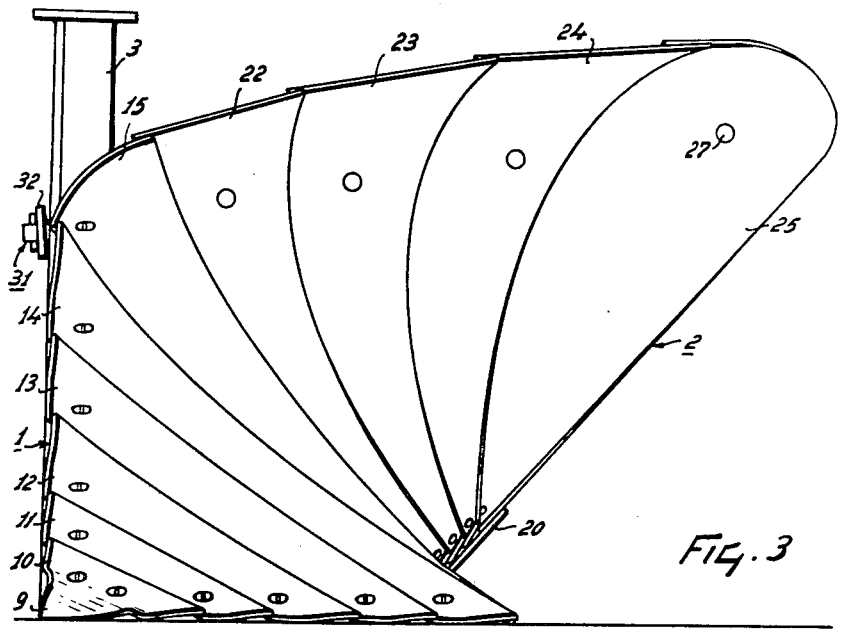

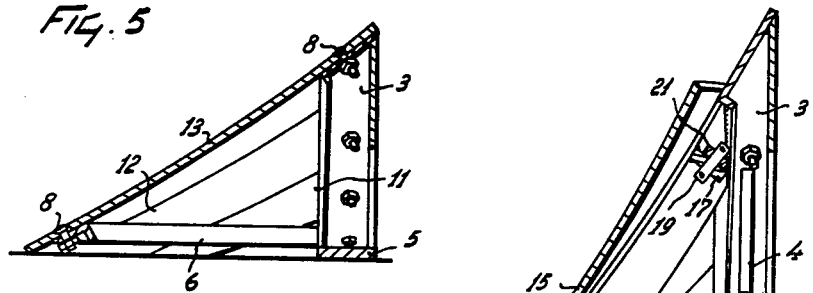
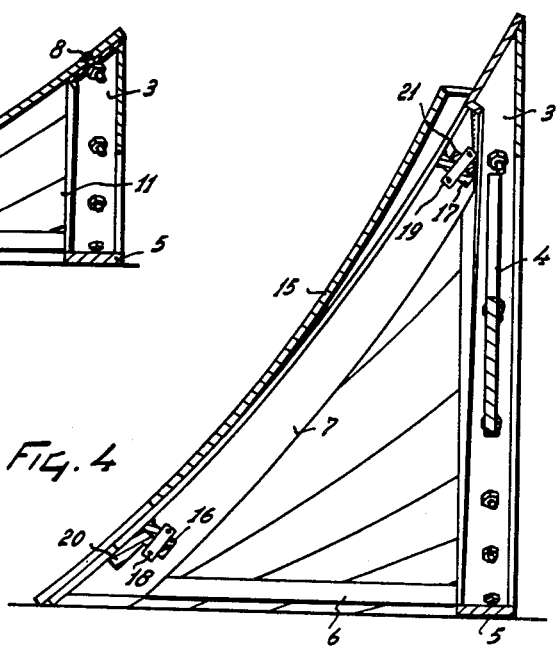
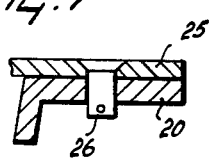
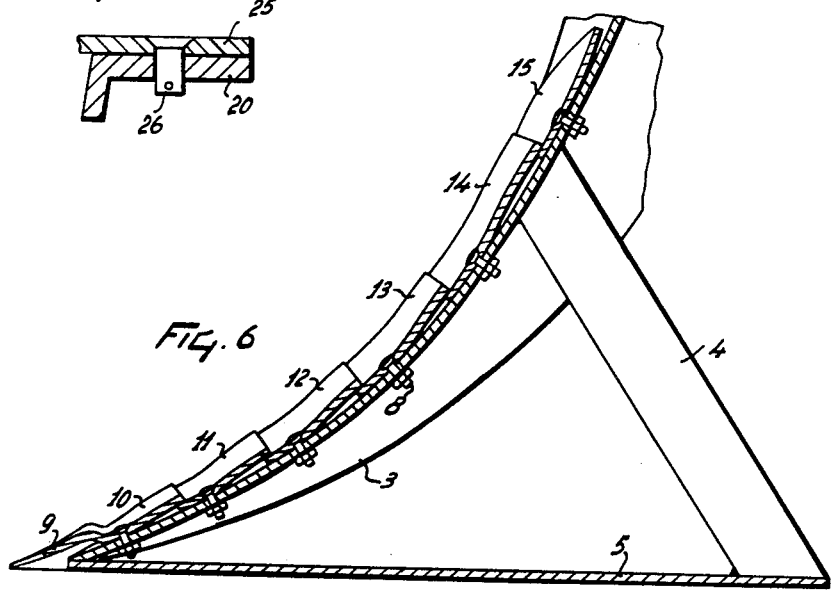

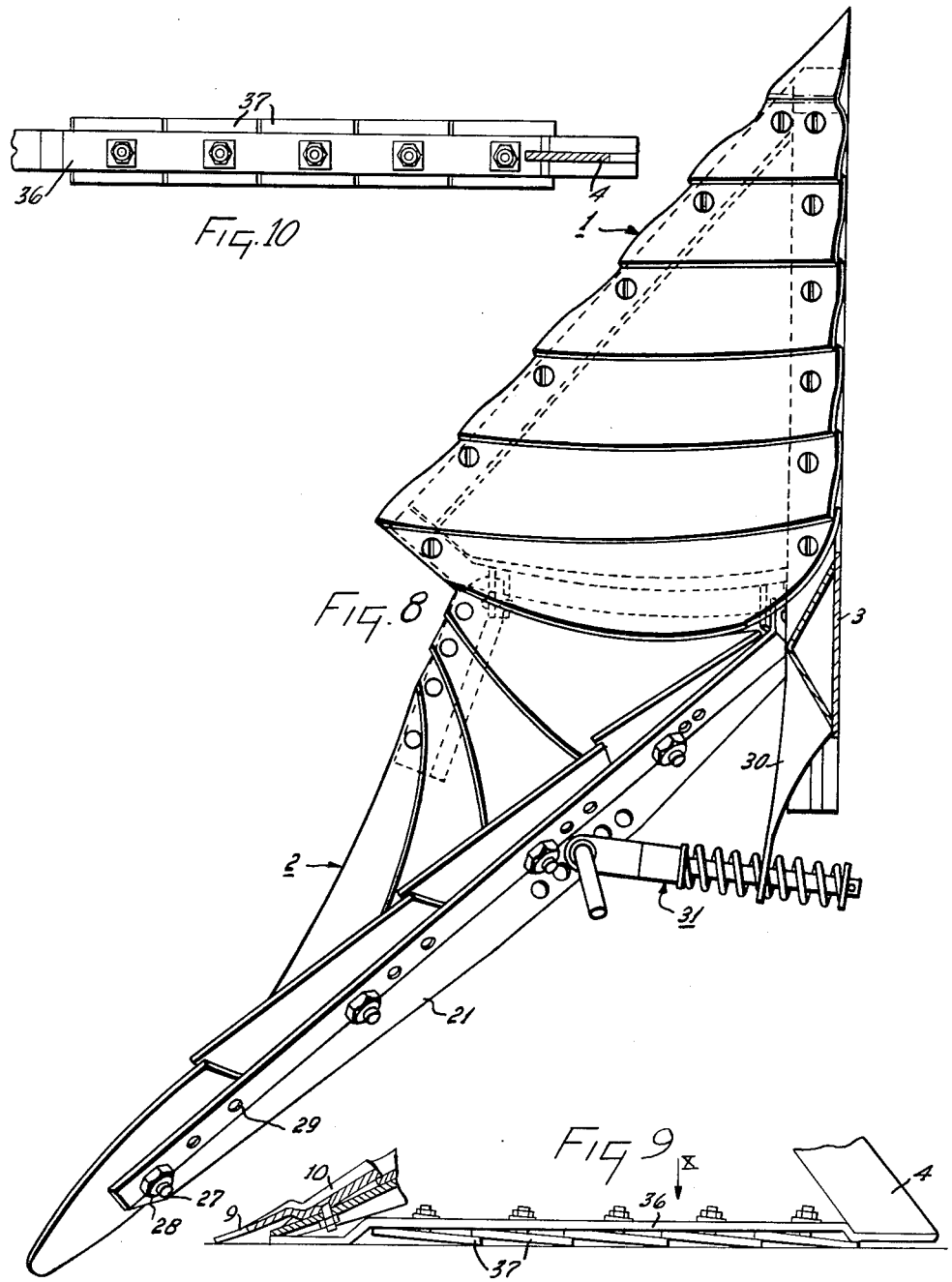

3,199,610
PLOUGH BODIES
Cornelis van der Lely, Zug, Switzerland, assignor to C. van der Lely, N.V., Maasland, Netherlands, a Dutch limited-liability company
Filed May 14, 1963, Ser. No. 280,406
Claims priority, application Netherlands, May 29, 1962, 279,080
9 Claims. (Cl. 172—736)

This invention relates to plough bodies and has, as an object, to provide plough bodies which can be readily adjusted to suit different operating conditions.

According to the invention, there is provided a plough body that includes a plurality of elements which are arranged one behind the other considered in the direction in which a furrow slice moves relative to the plough body during the use thereof, the arrangement being such that at least some of said elements are adjustable in position relative to one another in a direction extending substantially parallel to the first-mentioned direction.

For a better understanding of the invention, and to show how the same may be carried into effect, reference will now be made, by way of example, to the accompanying drawings, in which:

FIGURE 1 is a plan view of a plough body in accordance with the invention,

FIGURE 2 is an elevation as seen in the direction indicated by the arrow II of FIGURE 1, FIGURE 3 is an elevation as seen in the direction indicated by the arrow III of FIGURE 1, FIGURE 4 is a section taken on the line IV—IV of FIGURE 1, FIGURE 5 is a section taken on the line V—V of FIGURE 1, FIGURE 6 is a section taken on the line VI—VI of FIGURE 1, FIGURE 7 is a section, to an enlarged scale, taken on the line VII—VII of FIGURE 2, FIGURE 8 corresponds to FIGURE 1 but shows certain parts occupying different relative positions to those illustrated in the former figure, FIGURE 9 is a side elevation of an alternative form of plough shoe intended to form part of a plough body, and FIGURE 10 is a plan view as seen in the direction indicated by the arrow X of FIGURE 9.

Referring to the drawings, the plough body which is shown in full in FIGURES 1 to 3 of the drawings comprises a soil-cutting share which is generally indicated by the reference numeral 1 and a mouldboard which is generally indicated by the reference numeral 2. The plough body also includes a leg 3 which is inclined upwardly and rearwardly relative to the intended direction of travel of the plough body and whose uppermost end is adapted to be fastened to a plough beam (not shown). A support 4 projects downwardly from the leg 3 and its lowermost end carries a plough shoe 5 in the form of a horizontally disposed flat strip extending in the intended direction of travel of the plough body. The lowermost leading end of the leg 3 has one end of a support 6 fastened to it, this support being horizontally disposed and extending rearwardly from its point of connection to the leg 3 at an acute angle to the intended direction of travel of the plough body. The rearmost end of the support 6 is linked to the leg 3 at a point adjacent the rearmost end thereof by an upwardly inclined connection piece 7 (FIGURES 1 and 4).

The share 1 of the plough body is afforded by seven strip-shaped elements 9 to 15 that are secured to the leg 3 and the support 6 by bolts 8. Each of the elements 9 to 15 extends transverse to the direction in which, during use of the plough body, a furrow slice moves along the said body and their widths progressively increase from the foremost element 9 to the rearmost element 15 so that, in plan view (FIGURE 1), the share 1 has an approximately right-angled triangular shape. As can be seen in FIGURE 1, the "hypotenuse" side of this triangle constitutes the cutting edge of the share 1 while the "opposite" side of the triangle extends substantially parallel to the intended direction of travel of the plough body.

The elements 9 to 15 are arranged in such a way that, viewed in a direction transverse to the intended direction of travel of the plough body (FIGURE 2), they overlap one another in imbricate relationship. The leading edge of each element relative to the intended direction of travel of the plough body is disposed at a lower level than the rearmost edge, the various elements extending transverse to the direction in which a furrow slice moves along them during use of the plough body and the elements progressively increasing in width from the foremost element 9 to the rearmost element 15.

Owing to the overlapping relationship of the various elements 9 to 15, the "hypotenuse" side of the aforementioned right-angled triangle which constitutes the cutting edge of the share 1 has an approximately sawtoothed shape. The rearmost edges of the various elements 9 to 14 which, at their ends, form the "teeth" of the cutting edge progressively increase in width from the foremost element 9 to the rearmost element 14, it being apparent from FIGURES 1 and 3 that the element 15 does not, in fact, form one of the "teeth" which have just been mentioned.

The two leading elements 9 and 10 are of integral formation and the rearmost element 15 which adjoins the mouldboard 2 is shaped in such a way that its leading edge has a greater width than its rearmost edge (see FIGURE 1).

The connecting piece 7 carries lower and upper apertured lugs 16 and 17 respectively (FIGURE 4), lower and upper brackets 20 and 21 respectively being turnably connected to the said lugs with the aid of aligned pivot pins 18 and 19. The brackets 20 and 21 are interconnected by four strip-shaped elements 22, 23, 24 and 25 which together constitute the mouldboard 2 of the plough body. The elements 22 to 25 extend transverse to the direction in which, during use of the plough body, a furrow slice moves along them and they are curved in such a way that one lateral edge of each element is foremost relative to the intended direction of travel of the plough body. It will be apparent from the drawings that the elements 22 to 25 are arranged in overlapping relationship in a similar manner to the elements 9 to 15. The leading element 22 of the mouldboard 2 is arranged in overlapping relationship with the rearmost element 15 of the share 1, the rearmost edge of the element 15 being arranged above the foremost edge of the element 22.

It can be seen from the drawings that each of the elements 22 to 25 increases in width from the end thereof which abuts against the bracket 20 to the end thereof which abuts against the bracket 21, the narrower ends being connected to the bracket 20 with the aid of short pivot pins 26 (FIGURE 7). The wider ends of the elements 22 to 25 are secured to the bracket 21 with the aid of bolts 27 entered through holes 29 formed in the said bracket and nuts 28.

As can be seen in FIGURE 1, a series of three holes 29 is formed in the bracket 21 in respect of each of the elements 22 to 25, said holes being located at equal distances from the longitudinal axis of the corresponding pivot pin 26. By entering the bolts 27 through different ones of the holes 29, the length and mode of action of the mouldboard 2 can be adjusted. FIGURE 8 shows the mouldboard 2 adjusted in the manner just described so as to have a greater length than when it is arranged as illustrated in FIGURE 1.

It can be seen from FIGURE 2 of the drawings that the uppermost widest ends of the elements 22 to 25 are so shaped that they lie in a substantially unbroken line. The leg 3 carries a rearwardly projecting apertured lug 30 which supports a mouldboard adjusting stay which is generally indicated by the reference numeral 31. The stay 31 includes a rod 38 which is entered through the hole in the lug 30 and a fork 39 which is fastened to one end of the rod 38. As can be seen in FIGURE 1, the rod 38 is surrounded by two helical compression springs 33 which are located on opposite sides of the lug 30 and which bear between that lug and washers 32 located at opposite ends of the rod. A projecting rib of the bracket 21 is formed with a row of five holes 35 and the fork 39 of the stay 31 can be pivotally connected to the bracket 21 by entering a combined retaining and pivot pin 34 through a chosen one of the holes 35 and through aligned holes formed in the limbs of the fork 39. It will be apparent that, upon choosing a different one of the holes 35 to co-operate with the stay 31 and pin 34, the whole of the mouldboard 2 will be turned relative to the share 1 about an axis which is afforded by the aligned pivot pins 18 and 19 (FIGURE 4). As can be seen from the drawings, this axis extends very approximately perpendicular to the direction in which a furrow slice moves along the mouldboard 2 during use of the plough body. However, it also extends very approximately parallel to the surface of the mouldboard 2 which is contacted by a furrow slice at such time. The axis is, in fact, located adjacent the centre of the plough body and is inclined to the horizontal at an angle of between 30° and 60°.

FIGURES 9 and 10 illustrate a plough shoe which may take the place of the plough shoe 5 which has previously been described. The shoe comprises a supporting strip 36 to the lowermost side of which five plates 37 are bolted. The plates 37 are located one behind the other considered in the intended direction of travel of the plough body and are arranged in overlapping imbricate relationship with the rearmost edge of each plate beneath the foremost edge of the plate which succeeds it in the intended direction of travel. The elements which are afforded by the plates 37 contact the surface of the ground over an area which is determined principally by the consistency of the soil but it will be apparent that, in general, the area of contact between the plough shoe and the ground surface is substantially less when the embodiment illustrated in FIGURES 9 and 10 is employed than when the previously described plough shoe 5 is employed. The reduction in the area of contact between the plough shoe and the ground generally results in a reduction of the tractive effort which is necessary to operate a plough provided with the plough bodies which have been described.

In the use of a plough provided with at least one plough body of the kind which has been described, the share 1 cuts a furrow slice which slides along the said share onto the mouldboard 2 which acts to raise and invert the furrow slice. As can be seen in FIGURE 1, the plough body is formed principally by the elements 9 to 15 and the elements 22 to 25 the foremost of which, in plan view, extend approximately perpendicular to the intended direction of travel of the plough body whilst the rearmost elements of extend approximately parallel to said direction. Nevertheless, each element extends transverse to the direction of movement of a furrow slice relative to that element during use of the plough body. The soil of a furrow slice only contacts a part of each element by virtue of the overlapping relationship of the various elements so that the total area of contact between the plough body and the soil is substantially reduced in comparison with constructions in which the shares 1 and mouldboards 2 are made principally or wholly in one piece. It can be seen from FIGURES 1 and 6 of the drawings that the sides of the various elements of the share 1 and mouldboard 2 increase from the foremost element to the rearmost element so that the overlapping joints between the elements occur more frequently in those regions of the plough body which have to withstand the greatest resistance from the soil during use of the plough body. The arrangement which has just been mentioned ensures that the area of contact between the plough body and the soil is at a minimum in these regions.

The serrated cutting edge of the share 1 enables the latter to cut the soil in a very efficient manner and the arrangement of the stay 31 which allows the inclination of the mouldboard 2 to be changed relative to the share 1 allows the mouldboard to be brought to the best possible setting having regard to the nature of the soil which is to be worked. The pivot pins 26 lie adjacent one another in substantially the same plane and, as previously described, the elements 22 to 25 can be turned about said pivot pins in a manner similar to the opening or closing of the segments of a fan to increase or decrease the effective length of the mouldboard 2. The length of the mouldboard 2 can thus be brought to a setting which is appropriate to the particular ploughing speed which is to be employed.

The longitudinal axes of the pivot pins 26 extend approximately perpendicular to the direction of movement of a furrow slice relative to the plough body at the point at which said furrow slice makes contact with the corresponding element. It can be seen from the drawings that the lowermost end of the foremost mouldboard element 22 is very approximately horizontally disposed whereas at least the major part of the rearmost element 25 is very approximately vertically disposed. Each element has, in fact, a curved configuration which enhances the rigidity of the elements and enables them to guide a furrow slice satisfactorily in all the various positions of adjustment of the said elements. The resilient mounting of the mouldboards adjusting stay 31 which is effected by the springs 33 allows the mouldboards 2 to deflect resiliently when required to avoid damage and also allows the mouldboards 2 to perform an irregular resiliently damped oscillatory motion about the axis afforded by the pivot pins 18 and 19. This motion facilitates the sliding movement of a furrow slice along the mouldboard 2.

The plough body which has been described requires a reduced tractive effort in the use thereof in comparison with a plough body of conventional construction. The plough body can, however, readily be brought to a setting which is appropriate to the nature of the soil which is to be worked and to the ploughing speed which is to be employed. The fact that the plough body is constructed principally from separate elements enables it it be manufactured and assembled in a simple manner and enables a user to replace any element which has become worn or damaged without difficulty.

What I claim is:

1. A plough body having as oil confronting surface, said surface consisting of a plurality of separate strip-shaped elements arranged one behind the other in overlapping relationship, each element having a trailing edge portion overlapping the leading edge portion of a following element considered in the direction in which a furrow slice moves relative to the plough body during the use thereof, means for adjusting the position of at least some of said elements relative to one another and in a direction extending substantially parallel to the first-mentioned direction.

2. A plough body as claimed in claim 1, wherein each element is elongated in configuration and the elements are arranged so that their longer edges extend transverse to the direction in which a furrow slice moves relative to the plough body during the use thereof.

3. A plough body as claimed in claim 1, wherein, considered in the first-mentioned direction the elements progressively increase in width.

4. A plough body as claimed in claim 1, wherein each adjustable element progressively increases in width from one lateral side of the plough body to the opposite lateral side thereof.

5. A plough body as claimed in claim 1, wherein at least some of the elements are turnable relative to one another about pivotal axes, said axes being located near one end of said elements.

6. A plough body as claimed in claim 1, wherein at least some of the elements are curved.

7. A plough body having a share in which the soil confronting surface of the share consists of a plurality of relatively spaced steps, said steps being located one behind the other, said steps having leading edge portions and trailing edge portions, said leading edge portions being disposed at lower levels than the trailing edge portions considered in the direction in which a furrow slice moves relative to the share surface during use of the plough body, said plough body having a leg and said steps consisting of a plurality of separate strip-shaped elements supported at least in part by the leg.

8. A plough body as claimed in claim 7, wherein the elements are arranged to extend transverse to the first-mentioned direction, each element having a leading edge portion underlapping the trailing edge portion of a following element.

9. A plough body as claimed in claim 7, wherein the lengths of at least some of the elements progressively increase in a direction parallel to the first-mentioned direction.

References Cited by the Examiner

UNITED STATES PATENTS

| | | | |
|---|---|---|---|
| 85,533 | 1/69 | Reed | 172—761 |
| 118,551 | 8/71 | Peacock | 172—760 |
| 665,217 | 1/01 | Hays | 172—199 |
| 1,333,159 | 3/20 | Carter | 172—756 X |
| 2,841,068 | 7/58 | Takakita et al. | 172—736 |

FOREIGN PATENTS 588,433  1/24  France.

T. GRAHAM CRAVER, *Primary Examiner.*